United States Patent [19]

Blount

[11] 4,215,203

[45] Jul. 29, 1980

[54] PROCESS FOR THE PRODUCTION OF POLY(AMINE ALLYL HALIDE) COPOLYMER AND THEIR REACTION PRODUCTS

[76] Inventor: David H. Blount, 5450 Lea St., San Diego, Calif. 92105

[21] Appl. No.: 956,053

[22] Filed: Oct. 30, 1978

Related U.S. Application Data

[63] Continuation-in-part of Ser. No. 862,020, Dec. 19, 1977, which is a continuation-in-part of Ser. No. 757,239, Jan. 6, 1977, Pat. No. 4,069,391, which is a continuation-in-part of Ser. No. 622,525, Oct. 15, 1975, Pat. No. 4,020,259.

[51] Int. Cl.$^2$ .................. C08G 77/04; C08G 77/24; C08J 9/16
[52] U.S. Cl. ............................. 521/189; 521/133; 521/134; 521/178; 526/194; 526/279; 526/291; 528/392; 528/393
[58] Field of Search ............. 526/194, 279, 291; 528/392, 393; 521/133, 134, 178, 189

[56] References Cited

U.S. PATENT DOCUMENTS

| 3,691,113 | 9/1972 | Willis | 521/189 |
| 3,969,286 | 7/1976 | Wilson et al. | 521/178 |
| 4,089,840 | 5/1978 | Blount | 528/393 |
| 4,100,112 | 7/1978 | Blount | 528/393 |

OTHER PUBLICATIONS

Chem. Abs., vol. 58-5907(b).

Primary Examiner—Joseph L. Schofer
Assistant Examiner—Herbert J. Lilling

[57] ABSTRACT

Allyl halide-halohydrinamine copolymers may be produced by mixing an allyl halide and an amine compound with an oxidated silicon compound and then by adding a halohydrin while agitating for 10 to 60 minutes.

8 Claims, No Drawings

PROCESS FOR THE PRODUCTION OF POLY(AMINE ALLYL HALIDE) COPOLYMER AND THEIR REACTION PRODUCTS

CROSS-REFFERENCE TO RELATED APPLICATIONS

This application is a continuation-in-part of my copending application, Ser. No. 862,020, filed Dec. 19, 1977, which is a continuation-in-part of my copending application, Ser. No. 757,239, filed Jan. 6, 1977, now U.S. Pat. No. 4,069,391 which is a continuation-in-part of U.S. Patent Application Ser. No. 622,525, filed Oct. 15, 1975, now U.S. Pat. No. 4,020,259.

BACKGROUND OF THE INVENTION

This invention relates in general to the process for the production of allyl halide amine compounds and poly-(allyl halide amine) copolymer and their reaction products by using an oxidized silicon compound as the catalyst to polymerize the allyl halide with amine compounds.

Various silicon acids, silica, silicates containing silicon acids and silicates that will react with the halides in the allyl halides to produce silicon acids may be used as the catalyst. Various silicon acids such as silicoformic acid, polysilicoformic acid, hydrated silica and natural silicates containing free silicic acid radicals may be used as the catalyst. Various alkali silicates that will react with the halide in allyl halide such as alkali metal silicates, and alkaline earth metal silicates including sodium silicate, potassium silicate, lithium silicate, calcium silicate, cadmium silicate, barium silicate, zinc silicate, barium silicate, magnesium silicate, aluminum silicate, etc. may be used as the catalyst.

Silica may be heated in a dilute aqueous alkali metal hydroxide such as sodium hydroxide and potassium hydroxide, in the ratio of about 1 to 1 mols, until the water evaporates thereby producing a mono alkali metal silicate which may be used as the catalyst in this invention. Hydrated silica is the preferred catalyst and is preferred to be in a fine granular form. The silicoformic acid may be produced by the methods outlined in U.S. Pat. No. 3,674,430. Hydrated silica may be produced by any of the commonly known methods.

Some of the natural occuring silicates that may be used in this invention are clay, kaolin, silica, talc, asbestos, natrolite, garnet, mica, feldspar, beryl etc. and mixtures thereof.

The natural occuring silicates may be treated with a dilute mineral acid to produce more active silicic acid radicals present in the silicates.

Allyl halides may be produced by the addition of a halide to propylene. Methallyl halides may be produced by the addition of a halide to isobutylene. Other compounds with the combination

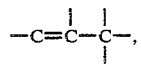

which is known as the allylic system, may be used in this invention. Allyl chloride is the preferred allyl halide.

Various mono-olefinic allyl type mono-halide with the essential grouping of atoms which may be represented as

wherein R is a hydrogen or a $C_1$ to $C_4$ alkyl group wherein X represents a halogen atom. Furthermore, these compounds contain only one olefinic group of which one of the unsaturated carbon atoms contains at least one hydrogen atom per molecule.

Representative examples of mono-olefinic allyl type mono-halides are such compounds as allyl chloride, allyl bromide, crotyl chloride, crotyl iodide, beta-methylallyl chloride, beta-methylallyl bromide, methyl vinyl carbinyl fluoride, alpha-dimethyl-allyl chloride, beta-cyclohexylallyl chloride, cinnamyl chloride, beta-ethyl-crotyl chloride, beta-phenylallyl bromide, alpha-dicyclohexylallyl chloride, beta-propylallyl iodide, beta-phenyl-allyl chloride, beta-cyclohexylallyl fluoride, 2-chloromethyl butene-1,2-chloromethyl pentene-1,2-chloromethyl hexene-1 and mixtures thereof.

Various organic amine compounds may be used in this instant invention such as alkylenepolyamines, alkylenimines, arylenediamines, alkyleneamines, aryleneamines, condensation products of an epihalohydrin and a poly(alkylene polyamine), ammonia, condensation products of epichlorohydrin and ammonia, hydrazine, alkanolamines, aminoethyl alkanolamine and mixtures thereof.

The alkylenepolyamines which may be used in this invention are well known compounds corresponding to the formula $H_2N((CH_2)_yNH)_x$—H in which x is one or more and y is an integer having a value of 4 to 10. Typical amines of this class are the alkylenediamines such as, 1,6-diamino-3-methyl-n-hexane, 1,3-propylenediamine 1,4-diamine-n-butane; 1,6-diamine-n-hexane, 1,10-diamino-n-decane and polyalkylenepolyamines such as diethylenetriamine, triethylenetetramine, tetraethylenepentamine and the corresponding polypropylenepolyamines and polybutylenepolyamines. Arylenediamines such as p-phenylenediamine may be used. Arylenedipolyamines may be used. Polyamide polymers with free amine radicals may be used in this instant process.

Various aliphatic and aromatic mono-amines such as methylamine, propylamine, isopropylamine, butylamine, amylamine, hexylamine, aniline, toluidine amine, xylidine amine, naphthylamine, benzylamine, vinyl amines and mixtures thereof may be used in this process, or they may be mixed with the polyamines and used in this process.

Various organic compounds containing an amine radical may be used in this process such as aminocaproic acid, aminobenzoic acid, vinyl amines, fatty acid amides, hydroxy amines, and mixtures thereof.

The polyamines may first be reacted with dicarboxyl acids, dicarboxyl anhydrides, epoxy compound and carbon disulfide to produce polyamine compounds with unreacted amine groups that may be used in this invention.

The organic polyamine compounds may be reacted chemically with silica, hydrated silica, and silicoformic acid to produce an organic polyamine silicate compound then may be reacted chemically with the allyl halide compound to produce a poly(mono-olefinic allyl type mono-halide amine silicate) copolymer.

Various polyamide resins containing 2 or more active amine radicals per molecule may be used in this invention. The polyamide resins may be produced by any of the commonly known methods.

Polyfunctional polyamines will also act as a cross-linking agent with poly(allyl halide) polymers and in the production of poly(ally halide amine) polymers. Bifunctional amines and polyfunctional amines may be mixed then reacted with the allyl halides to produce thermosetting resins. Various bifunctional amines may be used such as methylamine, ethylamine, ethanolamine, propylamine, N,N'-dimethylenediamine, piperazine, aniline, etc. Various polyfunctional polyamines may be used such as ethylenediamine, N-methylenediamine, polyalkylenepolyamines, polypropylenepolyamines, p-phenylenediamine; p,p'-bisaniline; 1,3-diamino-2-propanol, 1 mol of ammonia reacted with 3 mols of epichlorohydrin, etc. The reaction is enhanced by the presence of an alkali catalyst.

The allyl halide amine compound and polymer may be further reacted chemically with cross linking agents such as aldehydes, ketones, organic dicarboxyl acids, organic dicarboxyl anhydrides, aliphatic dihalide compounds, aliphatic trichlorides, sulfur, dihydroxy phenols, cyanides, lignin, epoxy compounds and resins, epihalohydrins, halohydrins, isocyanates, furan compound, thiocyanates, polyester, resins with 2 or more carboxyl acid radicals per molecule, acrylate polymers, polysulfides, sodium polysulfides, silicon acids, silicon tetrachloride, carbon disulfide and mixtures thereof to produce resins that can be used as adhesives, coating agents, impregnants, molding resins and powders, thermosetting resins, thermoplastic resins, etc.

SUMMARY OF THE INVENTION

I have discovered tht an amine and a mono-olefinic allyl type mono-halide compound will polymerize in the presence of a fine granular silica, silicon acid, alkali metal silicate, alkaline earth metal silicate and natural occuring silicates containing silicic acid radicals to produce a poly(amine allyl chloride) polymer.

The chemical reactions of this invention may take place under any suitable physical conditions. While many of the reactions will take place acceptably at ambient temperature and pressure, in some cases, better results may be obtained at somewhat elevated temperature and pressure. Preferably the reaction takes place at a temperature between 0° and 100° C. in a closed system. The reaction time to produce poly(amine allyl halide) polymers is quite varied. At ambient temperature about 70% to 90% of the reactants are polymerized in about 1 to 12 hours. The poly(amine allyl chloride) copolymer will form emulsions in water and most are water soluble.

The mono-olefinic allyl type mono-halide compound will react chemically with an amine to produce a mono-olefinic allyl type mono-halide amine compound. This compound will react chemically with aldehydes, ketone, organic dicarboxyl acids, organic dicarboxyl anhydrides, organic dihalide compounds, epoxy compounds and resins, epihahydrin, halohydrins isocyanates, furan compounds, thiocyanates, polysulfides, carbon disulfides, sodium sulfides, silicon acids, silicon tetrachloride, polyester resins with 2 or more active carboxyl acid radicals per molecule, aliphatic trihalides, organic cyanides, phenoplasts, aminoplasts, and mixtures thereof.

Various halohydrins may be used as a cross-linking agent such as alpha-dichlorohydrin, dibromhydrin, diiodohydrin, epichlorohydrin, epibromhydrin, and mixtures thereof. They may be reacted chemically with the mono-olefinic allyl type allyl mono-halide amine compound and poly(mono-olefinic allyl type mono-halide amine) copolymer. When an acid catalyst is used, a thermosetting copolymer is produced, and when an alkali catalyst is used, a thermosetting copolymer is produced. In certain cases where a large amount of the allyl halide is used, it may be thermoplastic.

Various alkali catalysts and reactants may be used in this invention such as sodium hydroxide, potassium hydroxide, sodium carbonate sodium oxide, potassium oxide, calcium hydroxide, sodium polysulfide, potassium silicate and mixtures thereof.

Various acid catalysts may be used in this invention such as hydrochloric acid, sulfuric acid, sodium hydrogen sulfate, potassium hydrogen sulfate, acetic acid, phosphoric acid, benzoic acid, acetic acid and mixtures thereof.

The preferred method to produce mono-olefinic allyl type mono-halide reaction products is to mix an organic amine compound or polymer containing active aine radicals with a mono-olefinic allyl type mono-halide compound, in the ratio of 0.5 to 2 mols of the allyl halide to 1 mol of the amine while agitating at a temperature between ambient temperature and the boiling temperature of the mixture, and at ambient pressure for 10 to 60 minutes, thereby producing a mono-olefinic allyl type mono-halide amine reaction product.

The mono-olefinic allyl type mono-halide amine may be reacted chemically with a cross-linking agent to produce a copolymer. The copolymer, when produced with an acid catalyst, is a thermosetting copolymer, and when an alkali catalyst is used, a thermosetting polymer is produced, as a general rule. The preferred cross-linking agent is an epihalohydrin, epichlorohydrin.

The mono-olefinic allyl type mono-halide amine reaction product may be further polymerized by mixing it with an oxidized silicon catalyst then by agitating for 10 to 60 minutes, thereby producing a poly(mono-olefinic allyl type mono-halide amine) copolymer.

The preferred method to produce poly(mono-olefinic allyl type mono-halide amine) copolymers is to mix 1 mol of an amine, 0.5 to 6 mols of a mono-olefinic allyl type mono-halide with an oxidated silicon compound in the ratio of about 0.25 to 1 part by weight of the oxidated silicon compound per 1 part by weight of the allyl halide and amine compounds. The mixture is then agitated for 10 to 60 minutes thereby producing poly(mono-olefinic allyl type mono-halide amine) copolymer. The copolymers in general are water soluble and may be filtered from the oxidated silicon catalyst.

An alternate method to produce poly(mono-olefinic allyl type mono-halide amine) copolymers is to mix 2 to 3 parts by weight of allyl halide with 1 part by weight of a fine granular oxidated silicon compound then to agitate for 10 to 60 minutes thereby producing a poly(mono-olefinic allyl type mono-halide) polymer. An amine is then mixed with the polymer in the ratio of 1 mol of the amine per 0.5 to 6 mols of the allyl halide while agitating for 10 to 60 minutes at ambient pressure and from ambient temperature to a temperature just below the boiling temperature of the mixture thereby producing poly(mono-olefinic allyl type mono-halide amine) co-polymer.

The poly(mono-olefinic allyl type mono-halide amine) copolymer may be reacted chemically with cross-linking agents to produce thermoplastic and thermosetting resins. When an acid catalyst is used with the cross-linking agent, usually a thermosetting resinous product is produced. When an alkali catalyst is used with the cross-linking agent, usually a thermosetting resin is produced. Epichlorohydrin is the preferred cross-linking agent.

The preferred method to produce a poly(allyl halide amine silicate) copolymer is to mix an alkali catalyst such as alkali metal sodium carbonate, potassium carbonate, sodium hydroxide, potassium hydroxide, and sodium silicate in about the amount of 1 mol per 2 to 6 mols of the allyl halide. The alkali catalyst is added in the first step of the preferred and alternate method of producing poly(mono-olefinic allyl type monohalide amine) copolymer, as outlined in this invention, thereby producing a poly(mono-olefinic allyl type mono-halide amine silicate) copolymer.

The poly(allyl halide amine silicate) polymer may be reacted chemically with a cross-linking agent to produce thermoplastic and thermosetting resins. The preferred cross-linking agent is an epichlorohydrin.

The mixture of poly(mono-olefinic allyl type monohalide amine) and oxidated silicon compounds may be reacted with a cross-linking agent such as epihalohydrin, halohydrins, epoxy compound or an epoxy resin with free epoxy groups, in the ratio of 1 mol of the cross-linking agent per mol of the oxidiated silicon compound, by slowly adding the cross-linking agent while agitating at ambient temperature to about 70° C., thereby producing thermoplastic and thermosetting poly(allyl amine silicate) resins. When an acid catalyst is used, a thermosetting resin is usually produced, and when an alkali catalyst is used a thermosetting resin is usually produced. The resin is cured by heating to 80° to 120° C. for a few minutes, 10 to 60 minutes.

The polyamine compounds my be reacted chemically with the oxidized silicon compounds then reacted chemically with the mono-olefinic allyl mono-halide compounds to produce poly(allyl halide amine silicate) copolymer. The polyamine compounds may be reacted chemically with oxidated silicon compounds such as silica, hydrated silica and silicoformic acid by mixing the polyamine compound with the oxidated silicon in the ratio of 2 mols of the amine to 1 to 4 mols of the oxidated silicon; then mixing in an alkali catalyst, selected from the group consisting of sodium carbonate, sodium hydroxide, and potassium hydroxide in the amount of 1% to 10% by weight, percentage based on the weight of the oxidated silicate; then heating the mixture to just below the boiling temperature of the mixture while agitating at ambient pressure of 20 to 90 minutes, thereby producing an amine silicate. The method is further outlined in U.S. Patent Application Ser. No. 842,557 filed Oct. 11, 1977 by David H. Blount.

The various allyl halide-amine-halohydrin water soluble reaction product and allyl halide-amine-silicate-halohydrin water soluble reaction products can be utilized as an adhesive, impregnant and water resistant coating agent in the production of paper products, by applying the water soluble reaction product to the cellulose or paper then heating to 80° to 120° C. until the water evaporates, thereby producing a thermosetting resin on the paper product. The various allyl halide-amine-halohydrin liquid resinous products and halide-amine-halohydrin silicate liquid resinous products may be poured into molds of useful objects such as gears, knobs, art objects, washers, toys, etc. then heated to 80° to 120° C., thereby producing a hard, tough, resinous product.

The primary object of the present invention is to produce allyl halide amine compounds and reaction products. Another object is to produce poly(allyl halide-amine) resinous products. Another object is to produce poly(allyl halide amine polyfunctional halohydrin) resinous products. Still another object is to produce poly(allyl halide amine halohydrin silicate) resinous products. A further object is to produce water soluble thermosetting resinous products.

DESCRIPTION OF PREFERRED EMBODIMENTS

The following examples describe in detail certain preferred embodiments of the process of my invention. These preferred processes, of course, may be varied as described above with similar results. Parts and percentages are by weight unless otherwise indicated.

EXAMPLE 1

About 1 part by weight of methylamine, 2 parts by weight of allyl chloride and 1 part by weight of fine granular hydrated silica are mixed at ambient temperature and pressure. The chemical reaction is complete in 1 to 12 hours thereby producing poly(methylamine allyl chloride) copolymer.
  (a) 10 parts by weight of water are added to the mixture of poly(methylamine allyl chloride) copolymer and hydrated silica, then filtered to remove the hydrated silica; then 1.5 parts by weight of epichlorohydrin is gradually added while agitating and keeping the temperature below 70° C. for 10 to 60 minutes thereby producing a liquid poly(methylamine allyl chloride epichlorohydrin) resinous product. It is then heated to 80° to 100° C. for 10 to 60 minutes thereby producing a solid resinous product.

EXAMPLE 2

About 2 parts by weight of ethylenediamine and 2 parts by weight of allyl chloride are mixed then agitated for 10 to 30 minutes thereby producing allyl chloride ethylenediamine reaction product, (a mono-olefinic allyl type mono-halide polyamine reaction product). The allyl chloride ethylenediamine reaction product is soluble in water.

EXAMPLE 3

2 parts by weight of methyl allyl chloride, 2 parts by weight of 1,6-hexamethylenediamine are mixed in 6 parts by weight of water, containing hydrochloric acid which gives a pH of 4 to 5. Epichlorohydrin is slowly added to the mixture while agitating and keeping the temperature between ambient temperature and 70° C. until 3 parts by weight are added, thereby producing a water soluble polymer. The polymer is then heated to 80° to 120° C. for 10 to 30 minutes, thereby producing a thermosetting light yellow poly(mono-olefinic ally type mono-halide amine halohydrin) reaction product.

EXAMPLE 4

2 parts by weight of methyl allyl chloride. 2 parts by weight of 1,6-hexamethylenediamine and 2 parts by weight of water are mixed then heated to just below the boiling temperature of methyl allyl chloride thereby producing a mono-olefinic allyl type mono-halide amine reaction product.
  (a) 2 parts by weight of epichlorohydrin are slowly added to the above reaction product while agitating and keeping the temperature below 70° C. thereby producing a water soluble reaction product. The water soluble reaction product is then heated to 80° to 120° C. until the water evaporates, 10 to 60 minutes, thereby producing a thermosetting light yellow poly(mono-olefinic allyl type mono-halide amine halohydrin) reaction product.

EXAMPLE 5

2 parts by weight of 1,6-hexamethylenediamine are mixed in 6 parts by weight of water containing 2 parts by weight of sodium hydroxide flakes. 3 parts by weight of allyl chloride are added to the mixture while agitating for 10 to 60 minutes and keeping the temperature below the boiling temperature of allyl chloride thereby producing allyl chloride 1,6-hexamethylenediamine reaction product.

(a) Slowing add 3 parts by weight of epichlorohydrin to the above mixture while agitating and keeping the temperature below 70° C. thereby producing a water soluble allyl chloride 1,6-hexamethylenediamine epichlorohydrin reaction product.

(b) The above reaction product is then heated to 80° to 120° C. while agitating for a few minutes until foaming begins; the mixture expands 8 to 10 times its original volume thereby producing a poly(mono-olefinic allyl type monochloride amine halohydrin) cellular solid reaction product.

EXAMPLE 6

1 part by weight of aminobenzoic acid, 2 parts by weight of ethylenediamine and 3 parts by weight of allyl chloride are mixed then agitated for 10 to 60 minutes thereby producing a mono-olefinic halide amine reaction product.

(a) About 3 parts by weight of epichlorohydrin are slowly added to the above reaction product while agitating and keeping the reaction temperature below 70° C. for 10 to 60 minutes thereby producing a poly(mono-olefinic allyl type mono-halide amine halohydrin) reaction product.

(b) The above reaction product is heated to 80° to 120° C. while agitating thereby producing a thermoplastic solid reaction product.

EXAMPLE 7

1 part by weight of fine granular hydrated silica and 3 parts by weight of allyl chloride are mixed. The mixture sets for 1 to 12 hours thereby producing poly(allyl chloride) polymer. 1 part by weight of diethylenetriamine is mixed with the above poly(allyl chloride) polymer and agitated for 10 to 60 minutes thereby producing a poly(mono-olefinic allyl type mono-halide amine) reaction product.

(a) The said reaction product is filtered to remove the hydrated silica, then 2 parts by weight of epichlorohydrin are slowly added to 4 parts by weight of the above reaction product while agitating and keeping the temperature below 70° C., thereby producing a liquid poly(allyl chloride diethylenetriamine epichlorohydrin) reaction product. The liquid reaction product is then heated to 80° to 120° C. while agitating for a few minutes until the mixture begins to expand. It expands 3 to 6 times its original volume thereby producing a thermosetting poly(allyl chloride diethylenetriamine epichlorohydrin) cellular solid reaction product.

(b) 10 parts by weight of water are added to the above mixture of poly(mono-olefinic allyl type mono-halide amine) reaction product and hydrated silica then filtered to remove the hydrated silica; 0.5 parts by weight of potassium hydroxide pellets are mixed in with the aqueous reaction product, then 2 parts by weight of epichlorohydrin are slowly added while agitating and keeping the temperature below 70° C. for 10 to 60 minutes, thereby producing an aqueous solution of poly(allyl chloride diethylenetriamine epichlorohydrin) reaction product. The reaction product is then heated to 80° to 120° C. while agitating for 10 to 60 minutes until the water evaporates thereby producing a thermosetting solid resinous product.

(a) About 2.5 parts by weight of epichlorohydrin are slowly added to 5 parts by weight of the above poly(mono-olefinic allyl type mono-halide amine) reaction product and hydrated silica mixture while agitating and keeping the temperature below 70° C. for 10 to 60 minutes at ambient pressure. The mixture is then heated to 80° to 120° C. while agitating for a few minutes until the mixture begins to expand. The mixture expands 6 to 10 times its original volume thereby producing a solid cellular resinous product, poly(mono-olefinic allyl type halide mono-halide amine silicate).

EXAMPLE 8

2 parts by weight of methyl allyl chloride, 2 parts by weight dipropylenetriamine, 3 parts by weight of a fine granular silica and 1 part by weight of epichlorohydrin are mixed then agitated to keep the temperature below the boiling temperature of the reactants. Then 2 parts by weight of epichlorohydrin are slowly mixed while agitating and keeping the temperature below 70° C. for 10 to 60 minutes. The mixture is then heated to 80° to 120° C. while agitating until the mixture begins to expand, thereby producing a solid cellular, poly(mono-olefinic allyl mono-halide amine halohydrin silicate) reaction product.

EXAMPLE 9

A poly(mono-olefinic allyl halide amine halohydrin silicate) reaction product is produced by the following steps:

(a) mixing 1 part hydrated silica containing 5% sodium hydrogen sulfate with 2 parts by weight of allyl chloride; let it set for 1 to 12 hours thereby producing poly(allyl chloride) polymer;

(b) mixing in 1 part by weight of ethylenediamine and agitating for 10 to 60 minutes at ambient temperature and pressure;

(c) adding 10 parts by weight of water containing 0.5 part by weight of sodium carbonate;

(d) adding slowly 3 parts by weight of epichlorohydrin while agitating at ambient to 70° C. for 10 to 60 minutes, thereby producing a water soluble thermosetting resinous product;

(e) heating the water soluble resinous product to 80° to 120° C. for 10 to 60 minutes, thereby producing a tan, rubbery, solid reaction product.

EXAMPLE 10

2 parts by weight of allyl chloride, 2 parts by weight of fine granular clay and 2 parts by weight of an amine-terminated polymerized oil resin are mixed; then 3 parts by weight of epichlorohydrin are slowly added while agitating and keeping the temperature below 70° C. for 10 to 60 minutes. The mixture is then heated to 80° to 120° C. while agitating until the mixture begins to expand. It expands 6 to 10 times its original volume thereby producing a clear colored, cellular solid poly(-mono-olefinic allyl type monohalide amine halohydrin silicate) reaction product.

EXAMPLE 11

1 part by weight of fine granular hydrated silica containing 10% sodium carbonate and 2 parts by weight of diethylenetriamine are mixed then heated to just below the boiling temperature of diethylenetriamine while agitating for 20 to 60 minutes, thereby producing diethylenetriamine silicate. 2 parts by weight of methyl allyl chloride and 1 part by weight of allyl bromide are mixed with the diethylenetriamine silicate then agitated for 10 to 30 minutes, thereby producing a mono-olefinic allyl type mono-chloride amine silicate reaction product. About 3 parts by weight of epichlorohydrin are slowly added to the reaction product while agitating and keeping the temperature below 70° C. for 10 to 60 minutes. The mixture is then heated to 80° to 120° C. for 10 to 60 minutes thereby producing a solid poly(mono-olefinic allyl type mono-chloride amine halohydrin silicate) reaction product.

EXAMPLE 12

About 2 parts by weight of fine granular silica, 2 parts by weight of ethylenediamine and 1 part by weight of sodium hydroxide flakes are mixed then heated to just below the boiling temperture of ethylenediamine for 20 to 60 minutes at ambient pressure, thereby producing an aminosilicate compound. 3 parts by weight of allyl chloride are added to the aminosilicate compound while agitating for 10 to 60 minutes; then 3 parts by weight of epichlorohydrin are slowly added while agitating and keeping the temperature below 70° C. for 10 to 60 minutes. The mixture is then heated to 80° C. for 10 to 60 minutes thereby producing a cream colored, cellular solid poly(mono-olefinic allyl type mono-halide aminosilicate halohydrin) resinous product.

EXAMPLE 13

0.5 part by weight of fine granular sodium silicate, 0.5 part by weight of silicoformic acid, 3 parts by weight of allyl chloride and 6 parts by weight of water and 1 part by weight of propylamine and 1 part by weight of triethylenetetramine are added while agitating. Then 2 parts by weight of alpha-dichlorohydrin and 1 part by weight of allyl chloride are slowly added to the mixture while agitating and keeping the temperature below 70° C. for 10 to 60 minutes. The mixture is then heated to 80° to 120° C. for 10 to 60 minutes thereby producing a solid poly(mono-olefinic allyl mono-halide amine halohydrin silicate) resonous product.

EXAMPLE 15

About 6 mols of allyl halide, 3 mols of fine granular hydrated silica, 1 mol of diethylenetriamine and 200% by weight of water, containing sulfuric acid in an amount to give a pH of 5, percentage based on the weight of above reactants, are mixed then agitated for 10 to 60 minutes; then 1 mol of epichlorohydrin is slowly added while agitating and keeping the temperature below 70° C. for 10 to 60 minutes. The water soluble thermosetting reaction product is then heated to 80° to 120° C. for 10 to 60 minutes thereby producing a solid poly(mono-olefinic allyl type mono-halide amine halohydrin) resinous product.

EXAMPLE 16

One mole of diethylenetriamine, 0.5 mol of allyl chloride and 20% by weight of water, containing hydrochloric acid giving a pH of 5, are mixed; then 1 mol of epichlorohydrin is slowly added while agitating at a temperature between ambient and 70° C. for 10 to 60 minutes, thereby producing a water soluble thermosetting poly(allyl halide diethylenetriamide epichlorohydrin) reaction product. The reaction product is then heated to 80° to 120° C. for 10 to 60 minutes thereby producing a solid reaction product.

EXAMPLE 17

One mol of allyl chloride, one mol of tetraethylenepentamine and 300% by weight of water, percentage based on the weight of the reactant, are mixed; then dichlorohydrin (Cl CH$_2$.CH(OH).CH$_2$Cl) in the amount of 1 mol is slowly added while agitating and keeping the temperature between ambient and 70° C. to 10 to 60 minutes, thereby producing a water soluble resinous product. A concentrated aqueous solution, containing about 1 mol of sodium hydroxide, is slowly added while agitating and keeping the temperature below 70° C. for 60 minutes. This water soluble resinous product may be used in the production of wet strength paper by adding the resinous product to the paper pulp in water in the amount of about 3%, based on weight of the pulp. The paper sheets are then cured by heating at 80° to 120° C. for 10 to 60 minutes.

EXAMPLE 18

One mol of sodium silicate pentahydrate, one mol of methyl allyl chloride, one mol of tetraethylenepentamine and 300% by weight of water, percentage based on weight of the reactants, are mixed; 1.5 mols of dihalohydrin are slowly added while agitating and keeping the temperature below 70° C. for 10 to 60 minutes thereby producing a water soluble resinous product and sodium silicate. This aqueous solution may be diluted with water and used as an adhesive and to improve wet strangth. The paper is cured by heating the paper to 80° to 120° C. for 10 to 60 minutes.

EXAMPLE 19

3 mols of allyl chloride and 1 mol of 1,6-hexamethylenediamine, 1 mol of fine granular magnesium silicate and 300% by weight of water, percentage based on weight of reactants, are mixed then agitated for 10 to 60 minutes then filtered to remove the magnesium silicate. One mol of sodium hydroxide flakes is added slowly and mixed thoroughly; then about 1.2 mols of epichlorohydrin are slowly added while agitating and keeping the temperature below 70° C. for 10 to 60 minutes, thereby producing a liquid thermosetting resinous product. The liquid resinous product is then poured into a mold for gears, toy wheels, art objects, etc. and then heated to 80° to 120° C. thereby producing hard, tough, solid objects made of a poly(mono-olefinic allyl monohalide amine halohydrin) resinous product.

EXAMPLE 20

About 1 mol of fine granular silica, 1 mol of sodium hydroxide flakes and 200% by weight of water, percentage based on weight of the silica and sodium hydroxide, are mixed; then 2 mols of methyl allyl chloride are added while agitating for 10 to 60 minutes and keeping the temperature below the boiling temperature of methyl allyl chloride; 2 mols of 1,6-hexamethylene diamine are thoroughly mixed into the mixture; then 2.5 mols epichlorohydrin are slowly added to the mixture while agitating and keeping the temperature below 70° C. for 10 to 60 minutes, thereby producing a liquid thermosetting resinous product. The resinous products may be poured into molds of knobs, toys, gears, halides, etc., then heated to 80° to 120° C. for 10 to 60 minutes, thereby producing hard, tough, useful objects made from a poly(mono-olefinic allyl mono-halide amine halohydrin silicate) resinous product.

Although specific materials and conditions were set forth in the above Examples, these were merely illustrative of preferred embodiments of my invention. Various other compositions, such as the typical materials listed above may be used, where suitable. The reactive mixture and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for the production of allyl halide-halohydrinamine copolymers by the following steps:
    (a) admixing an allyl halide and an amine compound in ratio of 1 mol of the amine to 0.5 to 6 mols of the allyl halide with an oxidated silicon compound in the ratio of 1 part by weight of the oxidated silicon compound to 1 to 3 parts by weight of the allyl halide;
    (b) agitating said mixture for 10 to 60 minutes at a temperature between ambient temperature and the boiling point of the reactants;
    (c) adding a halohydrin to said mixture in the ratio of 0.5 to 2 mols of the halohydrin to one mol of the organic amine compound;
    (d) agitating the mixture at a temperature between ambient and 70° C. for 10 to 60 minutes, thereby
    (e) producing a liquid thermosetting resinous product;
    (f) heating the liquid resinous product between 80° C. and 120° C. for 10 to 60 minutes, thereby
    (g) producing a solid or cellular solid resinous product.

2. The process of claim 1 wherein the amine is selected from the group consisting of alkylenepolyamines, polyalkylenepolyamines, arylenediamines, alkyleneamines and mixtures thereof.

3. The process of claim 1 wherein the allyl halide is selected from the group consisting of allyl chlorine, methyl allyl chloride, allyl bromide, beta-methylallyl bromide and mixtures thereof.

4. The process of claim 1 wherein the oxidated silicon compound is selected from the group consisting of silica, hydrated silica, alkali metal silicates, alkaline earth metal silicates, natural occurring silicates containing active silicic acid radicals and mixtures thereof.

5. The process of claim 1 wherein the halohydrin is selected from the group consisting of alpha-dichlorohydrin, dibromohydrin, di-iodohydrin, epichlorohydrin, epibromohydrin and mixtures thereof.

6. The process of claim 1 wherein water is added in step (a) in the amount of 20% to 200% by weight, percentage based on the weight of the reactants.

7. The process of claim 1 wherein water, in the amount of 20% to 300% by weight, percentage based on weight of the reactants, is added in step (e) of claim 1; then said liquid thermosetting resinous product is filtered to remove the oxidated silicon compound.

8. The product produced by the process of claim 1.